(No Model.)
B. YOCH.
BRAKE AND TRUCK FOR MINING MACHINES.
No. 283,943. Patented Aug. 28, 1883.
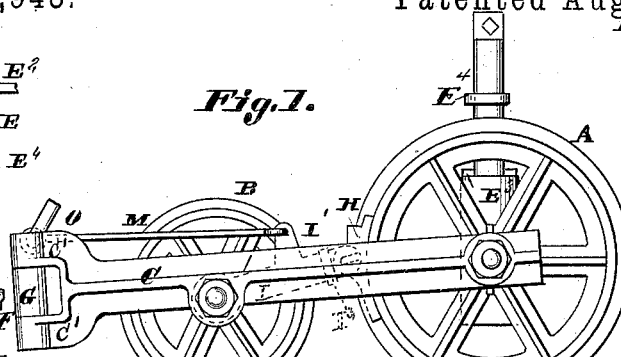
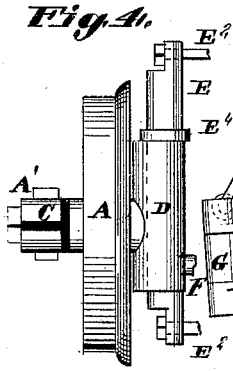
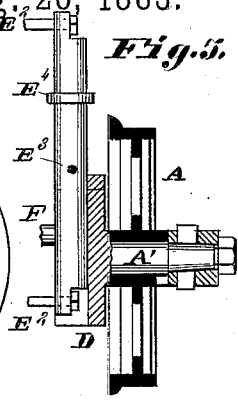
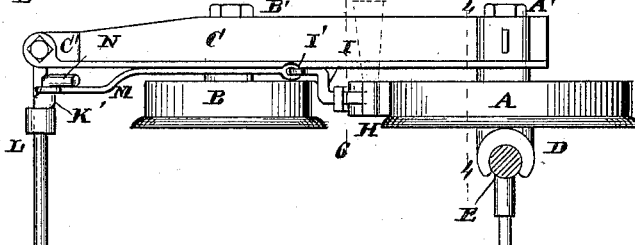
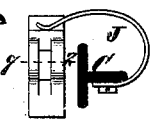
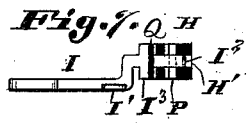
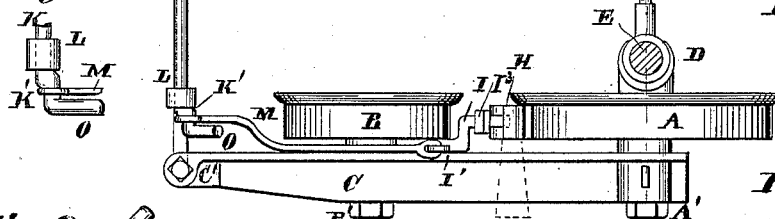
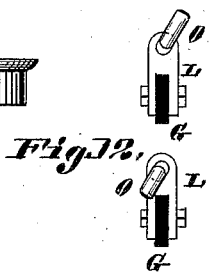
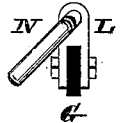
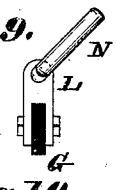
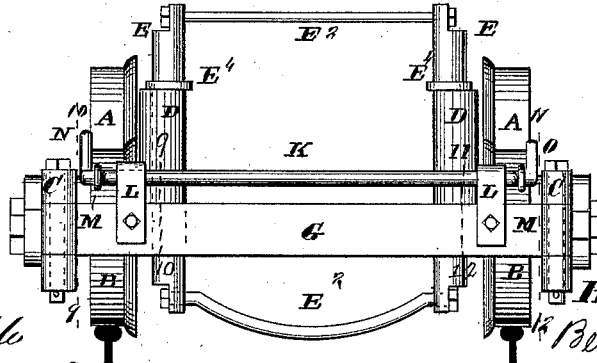
Attest:
Charles Pickle
Geo. S. Wheelock
Inventor:
Bernhard Yoch
By Knight Bros
Attys
N. PETERS, Photo-Lithographer, Washington, D. C.

UNITED STATES PATENT OFFICE.

BENHARD YOCH, OF ST. LOUIS, MISSOURI.

BRAKE AND TRUCK FOR MINING-MACHINES.

SPECIFICATION forming part of Letters Patent No. 283,943, dated August 28, 1883.

Application filed May 1, 1883. (No model.)

*To all whom it may concern:*

Be it known that I, BENHARD YOCH, of the city of St. Louis, in the State of Missouri, have invented a certain new and useful Improvement in Trucks for Mining-Machines, &c., of which the following is a full, clear, and exact description, reference being had to the accompanying drawings, forming part of this specification, and in which—

Figure 1 is a side elevation; Fig. 2, a top view; Fig. 3, a rear view; Fig. 4, a section taken on line 4 4, Fig. 2; Fig. 5, a section taken on line 5 5, Fig. 2. Fig. 6 is a section taken on line 6 6, Fig. 2. Fig. 7 is a section taken on line 7 7, Fig. 6. Fig. 8 is a detail top view. Figs. 9 and 10 are sections taken on line 9 10, Fig. 3, illustrating the different positions of the crank of the rock-shaft for operating the brake-shoes; and Figs. 11 and 12 are similar views taken on line 11 12, Fig. 4, showing the stop for the rock-shaft in its different positions.

I have only shown the truck, with its brake, of a mining-machine or other apparatus, as my invention does not in any way relate to the cylinder or the operating part of the machine or apparatus.

My invention relates, principally, to the brake, to the manner of its construction and operation, and, further, to the construction of the frame of the truck.

My invention consists in features of novelty pointed out in the claims.

Referring to the drawings, A represents the front wheels, and B the rear wheels, of the truck, connected by side bars, C, in which the trunnions A' B' of the wheels are secured. On the inner ends of the trunnions A' are tubes D, in which work vertically-adjustable rods E, having inwardly-extending projections F, on which the cylinder or other working part of the machine is supported, and which are connected by tie rods or bars E². When the machine is being moved from one place to another, the cylinder or working part is raised by the rods E sliding in the tubes D and supported in its elevated position by pins E³, passed through holes in the rods above the tubes. (See Figs. 1 and 5.) When the machine is at work, the cylinder or working part is lowered by removing the pins E³, and allowing the rods to fall in the tubes until collars E⁴ of the rods rest upon the tops of the tubes. (See Figs. 3 and 4.) The adjacent parts of the tubes D are open to allow the passage of the supporting pins or projections F and the lower tie-rod, E². The bifurcated rear ends, C', of the side bars, C, are connected by a cross-bar, G, as shown.

H H represent the brake-shoes operating on the front wheels and pivoted to the trunnions of the rear wheels by arms I I, having eyes which fit over the trunnions; or, instead of connecting with the trunnions B', the arms may be connected to any other fixed object. The arm of each shoe, together with the thickness of the shoe, is somewhat greater in length than the distance between the pivot-point of the arm and the wheel, so that when the shoe is pressed upon the wheel any backward turning of the wheel will have a tendency to carry the shoe downward, forming a "dead" lock upon the wheel. (See Fig. 1.) The shoes may be held in contact with the face of wheels by springs J, secured to the side bars, C, and bearing upon the tops of the shoes. (See Fig. 6.) The shoes may be raised so as not to operate on the wheels by means of a rock-shaft, K, journaled in brackets or straps L, secured to the cross-bar G. (See Fig. 3.) Each end of the shaft has a crank, K', which are connected to upwardly-extending projections I' of the arms I by rods M. (See Figs. 1 and 2.) When the cranks project forward, the shoes are in contact with the wheels; but when the shaft is turned to project the cranks away from the wheels, the shoes are drawn back away from the wheels. The shaft is turned by one of its ends being turned up, forming a handle, N. The other end of the shaft is also turned up, which forms a stop, O, by coming against the cross-bar G, to limit the backward turning of the shaft. The positions of the handle N and stop O when the shoes are against the wheels are shown in Figs. 9 and 11, and the positions of these parts when the shoes are pulled back from the wheels are shown in Figs. 10 and 12. The shoes are secured to their arms by tenons I² of the arms entering sockets H' of the shoes, and transverse pins P passing through slots in the shoes and holes in the tenons. When the shoes become worn by the wheels, they may be removed and washers Q placed on the tenons, which would occupy a space between the backs of the shoes when replaced, and the collars I³ of the arms, thus throwing the shoes farther forward, and compensating for the wear. (See Fig. 7.)

Although this truck is intended more especially for use for mining machinery, yet it may be used on other apparatuses where it is desired to retard any backward movement—as, for instance, on cannons, &c.

It is evident that a single brake-shoe would work by itself, if desired, and the springs J are not absolutely necessary to the working of the brake, as gravity will hold the shoes down to locking position in most cases, and other means than the rock-shaft may be employed to raise the shoes from the wheels.

I claim as my invention—

1. In a brake mechanism, the combination of wheel-trunnions, arms pivoted to said trunnions, having upward projections, and brake-shoes hinged to their outer ends, a transverse shaft journaled to the rear portion of the frame, having a crank at each end, and a handle at one end, and a stop at the other end, and rods connecting the projections on the arms to the cranks, as and for the purpose set forth.

2. The combination, with the brake-arms, of the springs J, secured to the frame, extending over it, and having their ends resting on the brake-arms, as set forth.

3. The combination, with the truck-frame and wheels, having trunnions journaled in the frame, of the brake-arms journaled to the trunnions between the wheels and frame, carrying a brake-shoe at their outer ends, and suitable means for raising and lowering said brake-arms, as set forth.

4. In a brake mechanism, the combination of a brake-arm, I, having projection I′, tenon I², and collar I³, brake-shoe H, having socket H′, transverse pin P, securing the tenon to the shoe, and a washer, Q, located between the shoe and collar, as set forth.

5. The combination of side bars, C, having bifurcated rear ends, C′, cross-bar G, secured between said ends, brackets L, secured to the cross-bar, shaft K, journaled in the brackets, having a crank and stop at one end and a crank and handle at the other end, rods M, and brake-arms I, as set forth.

6. In a truck, the combination of trunnions A′, having vertical tubes D at their inner ends, vertically-adjustable rods E, working in said tubes, having inwardly extending projections F, tie-rod E², connecting the projections, and supporting-pins E³ and collars E⁴, as set forth.

BENHARD YOCH.

Witnesses:
SAML. KNIGHT,
GEO. H. KNIGHT.